(12) United States Patent
Tummala et al.

(10) Patent No.: US 12,393,590 B2
(45) Date of Patent: Aug. 19, 2025

(54) SYSTEM AND METHODS FOR PROCESSING DATA QUERIES IN HYBRID DATA MESH ARCHITECTURES

(71) Applicant: JPMORGAN CHASE BANK, N.A., New York, NY (US)

(72) Inventors: Narayana R Tummala, Flower Mound, TX (US); Marco Pistoia, Amawalk, TX (US); Joseph W Ligman, Weston, CT (US); Elvir Azanli, Union, NJ (US); Pranav Deshpande, Jersey City, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/046,858

(22) Filed: Oct. 14, 2022

(65) Prior Publication Data

US 2024/0126761 A1   Apr. 18, 2024

(51) Int. Cl.
  *G06F 16/2455*   (2019.01)
  *G06F 16/22*   (2019.01)
  *G06F 16/25*   (2019.01)

(52) U.S. Cl.
  CPC .... *G06F 16/24556* (2019.01); *G06F 16/2246* (2019.01); *G06F 16/258* (2019.01)

(58) Field of Classification Search
  CPC ........... G06F 16/24556; G06F 16/2246; G06F 16/258
  USPC ....................................................... 707/756
  See application file for complete search history.

(56) References Cited

U.S. PATENT DOCUMENTS

| | | | |
|---|---|---|---|
| 7,889,676 B1 * | 2/2011 | Pulleyn | H04L 61/4552 370/254 |
| 8,326,825 B2 * | 12/2012 | Nehme | G06F 16/24532 707/719 |
| 10,871,950 B2 * | 12/2020 | De Smet | G06F 16/9024 |
| 11,392,354 B2 * | 7/2022 | Bird | G06F 8/751 |
| 2008/0168011 A1 * | 7/2008 | Steinberg | G06F 16/2365 706/12 |
| 2014/0012858 A1 * | 1/2014 | Wang | G06F 16/2264 707/743 |
| 2016/0112531 A1 * | 4/2016 | Milton | G06F 16/24556 709/205 |
| 2016/0210332 A1 * | 7/2016 | Milton | H04W 4/029 |
| 2019/0012752 A1 * | 1/2019 | Rockafellow | G06N 5/04 |

(Continued)

FOREIGN PATENT DOCUMENTS

CN    112749143 A  *  5/2021  ........... G06F 16/182

*Primary Examiner* — Giovanna B Colan
(74) *Attorney, Agent, or Firm* — GREENBERG TRAURIG LLP

(57) ABSTRACT

System and methods for processing data queries in hybrid data mesh architectures are disclosed. A method for processing data queries in hybrid data mesh architectures may include an in-memory query engine: (1) receiving, from a requestor, a data query to retrieve data; (2) parsing the data query into a parse tree; (3) converting the parse tree into a relational tree, wherein the relational tree is a tree representation of relational operators used to execute the data query; and (4) executing a data retrieval method selected from the group consisting of tree partitioning by cost and pruning using subtree replacement using a plurality of retrieval services to retrieve data from data stores identified by the data retrieval method.

17 Claims, 4 Drawing Sheets

(56) References Cited

U.S. PATENT DOCUMENTS

| | | | |
|---|---|---|---|
| 2019/0027233 A1* | 1/2019 | Bender | G06F 16/00 |
| 2019/0236149 A1* | 8/2019 | Kuruvada | G06F 16/14 |
| 2019/0370161 A1* | 12/2019 | Zhang | G06F 16/2365 |
| 2023/0130267 A1* | 4/2023 | Mukherjee | G06F 16/24526 |
| | | | 707/760 |
| 2023/0185781 A1* | 6/2023 | Kumar | G06F 16/214 |
| | | | 707/609 |

* cited by examiner

SYSTEM AND METHODS FOR PROCESSING DATA QUERIES IN HYBRID DATA MESH ARCHITECTURES

BACKGROUND OF THE INVENTION

1. Field of the Invention

Embodiments are generally related to hybrid data mesh architectures.

2. Description of the Related Art

Due to security reasons or slow application migration process, enterprise data is often distributed across many cloud platforms. This makes it a challenge to manage data across these platforms, often resulting in over- or under-retrieval of data from these cloud platforms.

SUMMARY OF THE INVENTION

System and methods for processing data queries in hybrid data mesh architectures are disclosed. In one embodiment, a method for processing data queries in hybrid data mesh architectures may include: (1) receiving, by an in-memory query engine and from a requestor, a data query to retrieve data; (2) parsing, by the in-memory query engine, the data query into a parse tree; (3) converting, by the in-memory query engine, the parse tree into a relational tree, wherein the relational tree is a tree representation of relational operators used to execute the data query; and (4) executing, by the in-memory query engine, a data retrieval method selected from the group consisting of tree partitioning by cost and pruning using subtree replacement using a plurality of retrieval services to retrieve data from data stores identified by the data retrieval method.

In one embodiment, the method may also include aggregating, by the in-memory query engine, data retrieved by the plurality of retrieval services; and returning, by the in-memory query engine, the aggregated data to the requestor.

In one embodiment, the requestor comprises a program or a tool.

In one embodiment, the data query further comprises an identifier, and the plurality of retrieval services provide the identifier to the data stores during data retrieval, wherein the data stores are configured to enforce data restrictions on the data retrieval based on the identifier. In one embodiment, the identifier comprises a Uniform Resource Identifier (URI), an Internet Protocol (IP) Address, and/or an executable location.

In one embodiment, the data query further comprise a data retrieval budget, and an amount of compute resources used in the data retrieval is based on the data retrieval budget.

In one embodiment, the in-memory query engine converts the parse tree into an abstract syntax tree (AST) and converts the AST into the relational tree.

In one embodiment, the method may also include validating, by the in-memory query engine, a syntax of the data query using an in-memory representation of the plurality of data stores.

In one embodiment, the in-memory query engine executes the tree partitioning by cost by iterating through all legal relational algebraic combinations of the relational tree and selecting a subtree from the iterations that has a lowest cost using a planner process.

In one embodiment, the in-memory query engine executes pruning using subtree replacement by matching specific relational subtrees with a single relational node using a tree traversal.

In one embodiment, the in-memory query engine and/or the plurality of retrieval services are executed in a secure enclave.

According to another embodiment, a method for schema discovery in hybrid data mesh architectures may include: (1) establishing, by an in-memory query engine, a connection with a plurality of data stores; (2) querying, by the in-memory query engine, each of the plurality of data stores for schema information for tables that are stored in the data store; (3) receiving, by the in-memory query engine, metadata comprising the schema information from the plurality of data stores; and (4) building, by the in-memory query engine, an in-memory representation of each table and a map representing a location of each table using the metadata.

In one embodiment, the plurality of data stores are identified in a catalog that identifies each of the plurality of data stores by name and location.

In one embodiment, the schema information comprises table name for tables, column names in the tables, and column data types for each of the columns.

In one embodiment, the in-memory query engine queries the plurality of data stores using a plurality of data retrieval services.

In one embodiment, the in-memory query engine and/or the plurality of retrieval services are executed in a secure enclave.

According to another embodiment, a non-transitory computer readable storage medium, including instructions stored thereon, which when read and executed by one or more computer processors, cause the one or more computer processors to perform steps comprising: receiving, from a requestor, a data query retrieve data; parsing the data query into a parse tree; converting the parse tree into a relational tree, wherein the relational tree is a tree representation of relational operators used to execute the data query; executing a data retrieval method from the group consisting of tree partitioning by cost and pruning using subtree replacement; and executing the data retrieval method using a plurality of retrieval services to retrieve data from data stores identified by the data retrieval method.

In one embodiment, the non-transitory computer readable storage also includes instructions stored thereon, which when read and executed by one or more computer processors, cause the one or more computer processors to aggregate data retrieved by the plurality of retrieval services and return the aggregated data to the requestor.

In one embodiment, the data query further comprises an identifier, and the plurality of retrieval services provide the identifier to the data stores during data retrieval, wherein the data stores are configured to enforce data restrictions on the data retrieval based on the identifier, wherein the identifier comprises a Uniform Resource Identifier (URI), an Internet Protocol (IP) Address, and/or an executable location.

In one embodiment, the data query further comprise a data retrieval budget, and an amount of compute resources used in the data retrieval is based on the data retrieval budget.

In one embodiment, the non-transitory computer readable storage also includes instructions stored thereon, which when read and executed by one or more computer processors, cause the one or more computer processors to execute the tree partitioning by cost by iterating through all legal relational algebraic combinations of the relational tree and selecting a subtree from the iterations that has a lowest cost using a planner process.

In one embodiment, the non-transitory computer readable storage also includes instructions stored thereon, which when read and executed by one or more computer processors, cause the one or more computer processors to execute pruning using subtree replacement by matching specific relational subtrees with a single relational node using a tree traversal.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments relate generally to systems and methods for processing data queries in hybrid data mesh architectures. Embodiments may implement an optimized data-mesh architecture that makes it easy to manage data across hybrid cloud platforms. Embodiments may use freely available database execution engines to implement JOINs across a plurality of distributed data stores, eliminating the need for multiple copies of datasets on multiple cloud platforms.

In embodiments, a data product owner may retain complete control over data and entitlements.

Embodiments may parse a data query (e.g., a SQL query) into a plurality of subqueries. Embodiments may use a data retrieval service (e.g., a SQL Lambda function, an engine, a service, a container, etc.) to retrieve data from data stores. The number of retrieval services used may scale according to budget, service level, performance, etc.

In embodiments, each data store may have its own entitlement requirements, and these entitlement requirements may be enforced at the data store level.

Embodiments may include a catalog or similar index that identifies data stores that may hold data. The catalog or similar may identify each data store's name, location, etc. The in-memory query engine may access the catalog or similar with minimal or no additional programming to access the data stores. Such access allows for the migration of applications between on-premises platforms and public cloud platforms.

In one embodiment query responses may be in a format that does not result in a copy of the response to the query being maintained on the network. For example, data may be represented in a columnar format where table data is organized and transferred in column chunks, rather than row-by-row. Each data chunk may be encoded in a binary format that is directly transferable to the networking protocol that is used. Each data chunk can be encoded and compressed independently of overall data transfer using standard compression techniques. Only the data needed to satisfy the data query may be transferred. This improves latencies.

Embodiments may provide a single log of data queries and responses thereto for proof of compliance with policies. The log may be stored in any suitable location, such as an audit database (not shown).

In embodiments, the in-memory query engine may run as a service and be executed using any suitable protocol including Java Database Connectivity (JDBC), gRPC Remote Procedure Calls (gRPC), HyperText Transfer Protocol (HTTP), etc. The in-memory query engine may also be compiled as a library and added directly into a Java application with interfaces exposed directly or transparently by Java reflection.

Embodiments may support ANSI SQL dialect as well as other extensions, which avoids application code changes.

Figure 1:
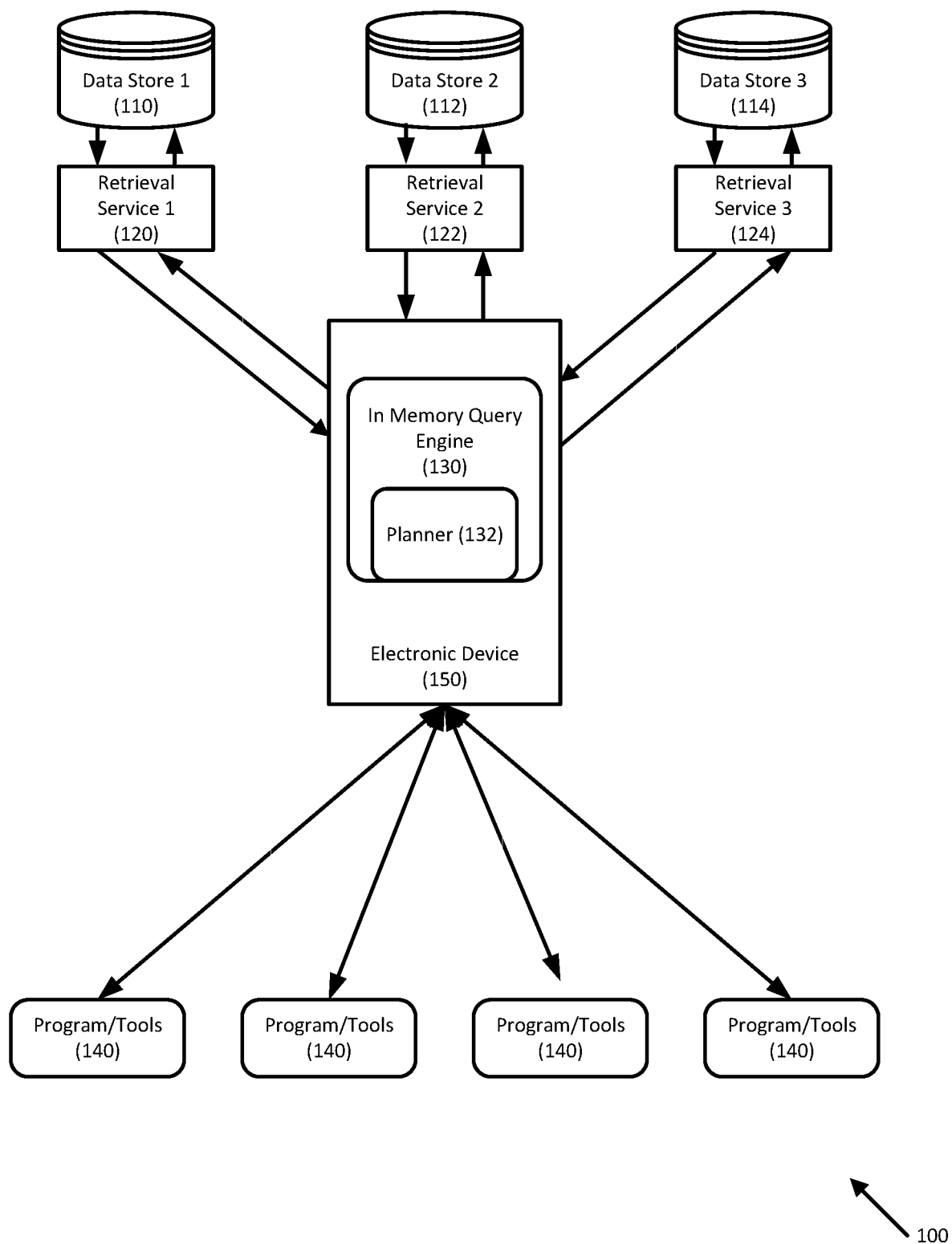
FIG. 1 depicts a hybrid data mesh architecture according to an embodiment.

Referring to FIG. 1, hybrid data mesh architecture is disclosed according to an embodiment. System 100 may include a plurality of data stores, such as data store 1, 110, data store 2 112, and data store 3 114. Note that greater or fewer data stores 110, 112, 114 may be provided as is necessary and/or desired. Data stores 110, 112, 114 may be cloud storage, databases, files on disk, etc.

Each data store 110, 112, 114 may be associated with a retrieval service, such as retrieval service 1 120, retrieval service 2 122, and retrieval service 3 124. Retrieval services 120, 122, 124 may be any service that retrieves data from a respective storage solution. Retrieval services 120, 122, 124 may run as a Lambda function, a service, an engine, a container, a stand-alone computer program, etc.

In one embodiment, the number of retrieval services may depend on a data query budget that may be provided by a requestor.

System 100 may include in-memory query engine 130 that may provide data federation. In-memory query engine 130 may run as a service and may be executed using any suitable protocol including JDBC, gRPC, HTTP, etc. In one embodiment, in-memory query engine 130 may receive a data query from program or tool 140, such as custom applications, Python code, business intelligence (BI) tools, command line, or other JDBC client. Program or tool 140 may be executed by a physical electronic device (not shown), in the cloud, etc.

In-memory query engine 130 may be executed by electronic device 150, which may be a server (e.g., a physical and/or cloud server), computers, etc.

In one embodiment, planner 132 may run as a process within in-memory query engine 130 and may iterate all legal relational algebraic combinations of the relational tree. Planner 132 may choose the "best" subtree (e.g., the subtree with the lowest cost or other objective) from the iterations. In another embodiment, planner 132 may apply heuristic planning by subtree replacement to identify data stores 110, 112, 114 that hold data for a data query.

In one embodiment, retrieval services 120, 122, 124, in-memory query engine 130, and/or programs/tools 140 may be executed by physical servers, in the cloud, combinations thereof, etc. Retrieval services 120, 122, 124, in-memory query engine 130, and/or programs/tools 140 may be executed in one or more secure environments, such as by processors or virtual machines implementing a secure enclave. An example of such a secure environment is an environment implementing Intel's Software Guard Extension (SGX) Enclave.

Figure 2:
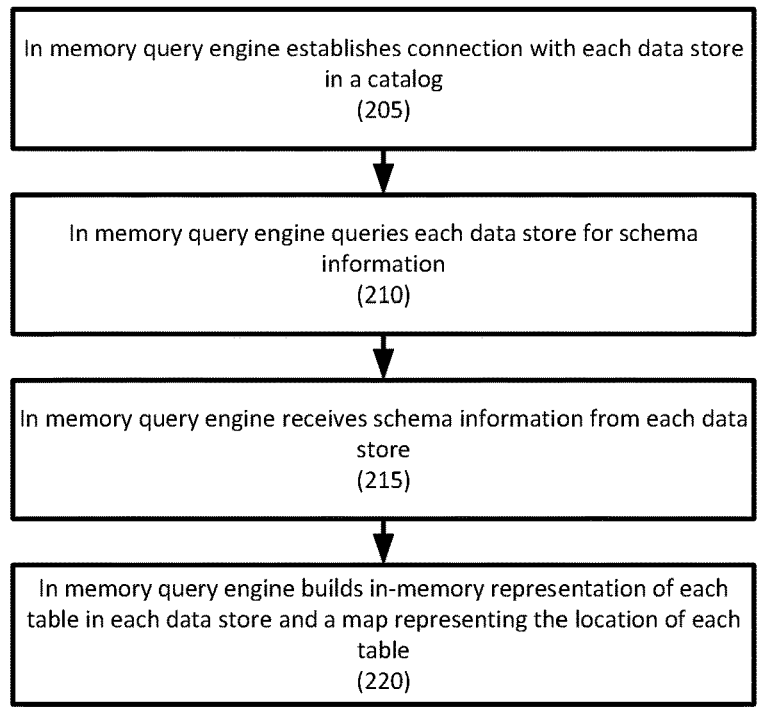
FIG. 2 depicts a method for schema discovery in a hybrid data mesh architecture according to an embodiment.

Referring to FIG. 2, a method for schema discovery in a hybrid data mesh architecture is disclosed according to an embodiment.

In step 205, an in-memory query engine executed by an electronic device, in the cloud, etc. may establish a connection (e.g., a network connection) to a plurality of data stores. In one embodiment, the in-memory query engine may be a JDBC library, and the data stores may be identified in a catalog that may be provide to the in-memory query engine. The catalog may identify each data store by, for example, name, location, etc.

In step 210, upon startup or as desired, the in-memory query engine may query each data store for schema information for tables that are stored in each data store using, for example, a retrieval service. For example, the in-memory query engine may request metadata for table names, column names, and each column's data type.

An example of a database scheme is provided in U.S. patent application Ser. No. 17/813,260, the disclosure of which is hereby incorporated, by reference, in its entirety.

In step 215, the in-memory query engine may receive the schema information from each data store. In embodiments, the schema information is declarative and may be encoded in a variety of markup languages, including JDBC, Json, Yaml, etc. The in-memory federation engine may identify the content type based on standard transfer protocol header fields. The in-memory query engine may then parse the format as based on the content type in the header field.

In step 220, the in-memory query engine may build an in-memory representation of each table as well as a map representing the location of each table. In one embodiment, the in-memory representation may only contain metadata about the data stores; no data may be retrieved during schema discovery.

In one embodiment, the in-memory representation may be used to validate a SQL syntax when the in-memory query engine receives a data query. For example, the in-memory query engine has no knowledge of the schema and therefore cannot validate syntax until it interrogates all storage locations for their schema information. Once the in-memory query engine has the schema, it creates the tables, columns, data types and it uses this information to validate SQL syntax.

In one embodiment, the in-memory query engine and/or the retrieval service may be executed in a secure environment, such as a secure enclave. This may be done to prevent leakage of the schema.

Figure 3:
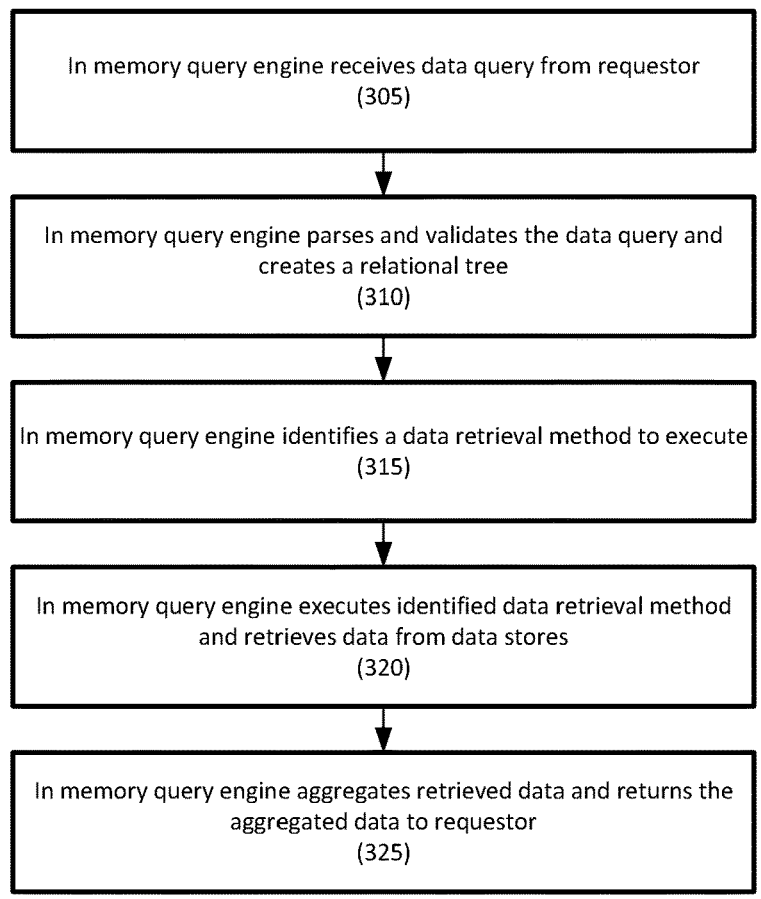
FIG. 3 depicts a method for processing data queries in hybrid data mesh architecture according to an embodiment.

Referring to FIG. 3, a method for processing data queries in hybrid data mesh architecture is disclosed according to an embodiment.

In step 305, an in-memory query engine may receive a data query from a requestor, such as a program or a tool. The request may include one or more identifiers, such as a Uniform Resource Identifier (URI), an Internet Protocol (IP) address, or an executable location. These identifiers may be used to instruct the in-memory query engine of the data location. During data retrieval, although the identifier is in a single request, the query engine may multiplex the request, scaling the data query across multiple execution locations. The execution scale may be controlled by the number of resources available.

In one embodiment, the data query may include a data retrieval budget for the data retrieval. This may be a dollar cost, a CPU cost, etc.

In step 310, the in-memory query engine may parse the data query into, for example, a parse tree, and may validate the data query. A parse tree is a graph or tree that represents the syntax and structure of an input. The input is typically a string or text file, and the parse tree is typically an intermediate representation that is used to validate syntax from a structured language, a language with a defined grammar.

The in-memory query engine may then create a relational tree for the data query from the parse tree. The relational tree is a tree representation of the relational operators used to execute the query. The relational operators are constructs used in relational algebra, such selection, projection, union, intersection, etc. The relational operators become the nodes in the graph.

In one embodiment, the in-memory query engine may convert the parse tree into an abstract syntax tree (AST) and may validate the syntax, and may then convert the AST into a relational tree.

In step 315, the in-memory query engine may select a data retrieval method to execute by planning. Planning is the process of traversing the relational tee to find the simplified version of function, such as by simplifying an algebraic expression. Executing the function is traversing the best graph and executing the algebraic operators.

The data retrieval method may be selected, for example, based on the lowest cost to execute, lowest amount of resources used, lowest latency, etc. to execute the data query. The data query may specify the objective of the data retrieval method, such as the lowest cost, lowest latency, etc. For example, one data retrieval method may involve execution tree partitioning by cost, and another data retrieval method may involve heuristic planning by subtree replacement.

Cost planning looks at all possible options for the "cheapest" solution. Heuristic planning is not exhaustive, it uses a heuristic to prune the search space. The two approaches have a trade-off between time and computation, where heuristic planning may fail on an edge case but can be significantly faster on the average case.

For execution tree partitioning by cost, a planner running as a process in the in-memory query engine may iterate all legal relational algebraic combinations of the relational tree. From all possible iterations of the legal relational algebraic combinations of the relational tree, the planner will choose the "best" subtree (e.g., the subtree with the lowest cost). For example, for each iteration, and for each node, the planner may traverse all child nodes. If all of the child nodes are from the same data store (e.g., co-located in the same remote location), a zero or low-cost identifier is assigned to the node. If not, a high-cost identifier may be assigned to the node.

The in-memory query engine may then select a single tree of nodes for execution.

The in-memory query engine planner may provide a custom algorithm to optimize the execution plan by pruning using subtree replacement. Specific relational subtrees (represented as rules) may be matched and replaced with a single relational node. Using a tree traversal, such as a depth-first search tree traversal, if a subtree is matched, all children of the subtree may be traversed. If all of the children are from the same data location (e.g., co-located in the same remote location), a "true" indicator may be returned, and the subtree may be replaced with a single node representing the execution needed for the common data location. If not, a false identifier may be returned, and the subtree is not replaced.

In step 320, the in-memory query engine may execute identified plan and retrieves data from data stores. In embodiments, the in-memory query engine may use a retrieval service to retrieve the data from the data stores. The retrieval service and the in-memory query engine may be executed in a secure environment, such as a secure enclave.

As part of the retrieval process, in one embodiment, the in-memory query engine may provide the identifier to the retrieval service. The retrieval service will use this identifier to enforce data restrictions and only return the data allowed.

In one embodiment, the number of compute resources may be selected based on a data retrieval budget for query processing and the cost for data retrieval. For example, execution of the data query may be executed by a single physical resource, or in in parallel by a plurality of physical resources. Examples of resources include CPU, memory, etc.

In step 325, the in-memory query engine may aggregate the retrieved data, and may return the aggregated data to the requestor.

Figure 4:
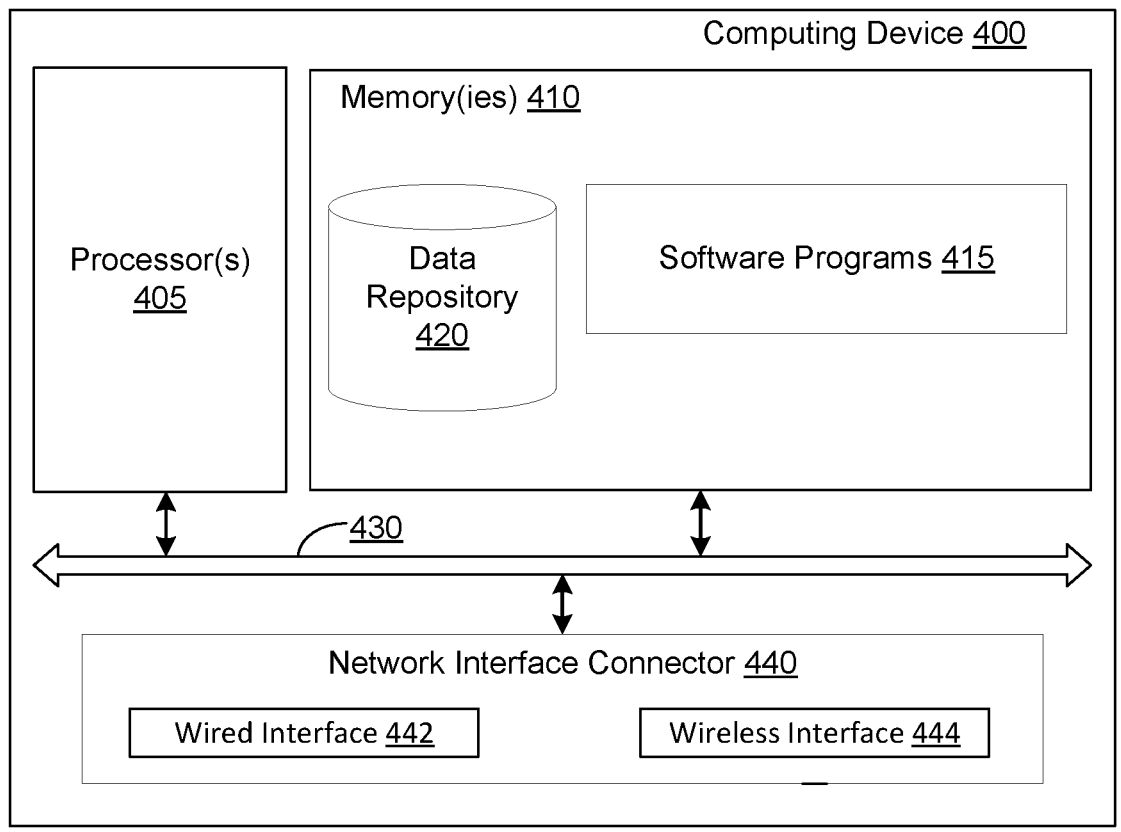
FIG. 4 depicts an exemplary computing system for implementing aspects of the present disclosure.

FIG. 4 depicts an exemplary computing system for implementing aspects of the present disclosure. FIG. 4 depicts exemplary computing device 400, such as electronic device 150. Computing device 400 may represent any of the components described herein. Computing device 400 may include processor 405 that may be coupled to memory 410. Memory 410 may include volatile memory. Processor 405 may execute computer-executable program code stored in-memory 410, such as software programs 415. Software programs 415 may include one or more of the logical steps disclosed herein as a programmatic instruction, which may be executed by processor 405. Memory 410 may also include data repository 420, which may be nonvolatile memory for data persistence. Processor 405 and memory 410 may be coupled by bus 430. Bus 430 may also be coupled to one or more network interface connectors 440, such as wired network interface 442 or wireless network interface 444. Computing device 400 may also have user interface components, such as a screen for displaying graphical user interfaces and receiving input from the user, a mouse, a keyboard and/or other input/output components (not shown).

Although several embodiments have been disclosed, it should be recognized that these embodiments are not exclusive to each other, and features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for processing data queries in hybrid data mesh architectures, comprising:
  receiving, by an in-memory query engine and from a requestor, a data query to retrieve data and an identifier for a data location, wherein the data query further comprises a data retrieval budget, and an amount of compute resources used in the data retrieval is based on the data retrieval budget;
  parsing, by the in-memory query engine, the data query into a parse tree;
  converting, by the in-memory query engine, the parse tree into a relational tree, wherein the relational tree is a tree representation of relational operators used to execute the data query;
  identifying, by the in-memory query engine, a data retrieval method selected from the group consisting of tree partitioning by cost and pruning using subtree replacement;

retrieving, by the in-memory query engine, data from the data location using a plurality of retrieval services and the data retrieval method; and enforcing data restrictions associated with the identifier during the retrieval.

2. The method of claim 1, further comprising:

aggregating, by the in-memory query engine, data retrieved by the plurality of retrieval services; and returning, by the in-memory query engine, the aggregated data to the requestor.

3. The method of claim 1, wherein the identifier comprises a Uniform Resource Identifier (URI), an Internet Protocol (IP) Address, and/or an executable location.

4. The method of claim 1, wherein the in-memory query engine converts the parse tree into an abstract syntax tree (AST) and converts the AST into the relational tree.

5. The method of claim 1, further comprising:

validating, by the in-memory query engine, a syntax of the data query using an in-memory representation of a plurality of data stores for the data location.

6. The method of claim 1, wherein the in-memory query engine executes the tree partitioning by cost by iterating through all legal relational algebraic combinations of the relational tree and selecting a subtree from the iterations that has a lowest cost using a planner process.

7. The method of claim 1, wherein the in-memory query engine executes pruning using subtree replacement by matching specific relational subtrees with a single relational node using a tree traversal.

8. The method of claim 1, wherein the in-memory query engine and/or the plurality of retrieval services are executed in a secure enclave.

9. A method for schema discovery in hybrid data mesh architectures, comprising:

establishing, by an in-memory query engine, a connection with a plurality of data stores;

querying, by the in-memory query engine and by using a plurality of data retrieval services, each of the plurality of data stores for schema information for tables that are stored in the data store;

receiving, by the in-memory query engine, metadata comprising the schema information from the plurality of data stores; and building, by the in-memory query engine, an in-memory representation of each table and a map representing a location of each table using the metadata.

10. The method of claim 9, wherein the plurality of data stores are identified in a catalog that identifies each of the plurality of data stores by name and location.

11. The method of claim 9, wherein the schema information comprises table name for tables, column names in the tables, and column data types for each of the columns.

12. The method of claim 9, wherein the in-memory query engine and/or the plurality of retrieval services are executed in a secure enclave.

13. A non-transitory computer readable storage medium, including instructions stored thereon, which when read and executed by one or more computer processors, cause the one or more computer processors to perform steps comprising:

receiving, from a requestor, a data query retrieve data and an identifier for a data location, wherein the data query further comprises a data retrieval budget, and an amount of compute resources used in the data retrieval is based on the data retrieval budget;

parsing the data query into a parse tree;

converting the parse tree into a relational tree, wherein the relational tree is a tree representation of relational operators used to execute the data query;

identifying a data retrieval method selected from the group consisting of tree partitioning by cost and pruning using subtree replacement;

retrieving data from the data location using a plurality of data retrieval services and the data retrieval method;

enforcing data restrictions associated with the identifier during the retrieval;

aggregating data retrieved by the plurality of retrieval services; and returning the aggregated data to the requestor.

14. The non-transitory computer readable storage medium of claim 13, wherein the identifier comprises a Uniform Resource Identifier (URI), an Internet Protocol (IP) Address, and/or an executable location.

15. The non-transitory computer readable storage medium of claim 14, further including instructions stored thereon, which when read and executed by one or more computer processors, cause the one or more computer processors to aggregate data retrieved by the plurality of retrieval services and return the aggregated data to the requestor.

16. The non-transitory computer readable storage medium of claim 13, further including instructions stored thereon, which when read and executed by one or more computer processors, cause the one or more computer processors to execute the tree partitioning by cost by iterating through all legal relational algebraic combinations of the relational tree and selecting a subtree from the iterations that has a lowest cost using a planner process.

17. The non-transitory computer readable storage medium of claim 13, further including instructions stored thereon, which when read and executed by one or more computer processors, cause the one or more computer processors to execute pruning using subtree replacement by matching specific relational subtrees with a single relational node using a tree traversal.

* * * * *